United States Patent [19]
Tang et al.

[11] Patent Number: 5,943,139
[45] Date of Patent: Aug. 24, 1999

[54] METHOD FOR ADJUSTING SCANNING SPEED OF A SCANNER

[75] Inventors: Chien-Hsing Tang; Kuan-Chih Huang, both of Taoyuan, Taiwan

[73] Assignee: Acer Peripherals, Inc., Taoyuan, Taiwan

[21] Appl. No.: 08/679,594

[22] Filed: Jul. 16, 1996

[51] Int. Cl.⁶ .................................................... H04N 1/00
[52] U.S. Cl. .......................... 358/412; 358/409; 358/406; 358/411
[58] Field of Search .................................... 358/406, 409, 358/410, 411, 412, 413, 419, 420, 421, 422, 423

[56] References Cited

U.S. PATENT DOCUMENTS 4,748,514  5/1988  Bell ......................................... 358/288

FOREIGN PATENT DOCUMENTS 4-3576  1/1992  Japan .

Primary Examiner—Jerome Grant, II
Attorney, Agent, or Firm—Winston Hsu

[57] ABSTRACT

A method for adjusting scanning speed of a scanner according to the data transmission rate between the scanner and a host computer to avoid accumulation of image data in the scanner's memory buffer is disclosed. The method comprises the following steps:

(1) initiating a time counter and transmitting a test data packet from the scanner to the host computer;

(2) acknowledging the scanner after the test data packet is completely received by the host computer;

(3) stopping the time counter and calculating the time used for transmitting the test data packet;

(4) calculating a data transmission rate according to the size of the test data packet and the time used to transmit the test data packet; and (5) adjusting the scanning speed of the scanner according to the data transmission rate.

7 Claims, 2 Drawing Sheets

METHOD FOR ADJUSTING SCANNING SPEED OF A SCANNER

BACKGROUND OF THE INVENTION

1. Field of the Invention

This invention relates to a scanner, and more particularly, to a method for adjusting scanning speed of a scanner.

2. Description of the Prior Art

Scanners are commonly used in office environment for scanning documents into computers. A scanner usually comprises a scanning module movably mounted over a shaft for scanning a document placed above the scanner, a step motor for moving the scanning module step by step, a memory buffer for storing image data scanned from the document, and a control unit for controlling the operations of the scanner and also communications with a host computer connected to the scanner. Within each step of the step motor, one line of the document is scanned by the scanning module and the image data is stored in the memory buffer. And then the control unit transmits the image data stored in the memory buffer to the host computer through an I/O cable for further processing.

The data transmission rate from the scanner to the host computer is depended on the communication protocol used between the scanner and the host computer, maximum scanning speed of the scanner, and the processing speed of the host computer. If the transmission rate is higher than the scanning speed of the scanner, the scanner can run in full speed until a document is completely scanned. But if the transmission rate is slower, image data will be accumulated in the memory buffer and it may get full after portion of a document is scanned. When such condition happens, the scanning module must be stopped to avoid possible loss of the image data. After the image data accumulated in the memory buffer is later on transmitted to the host computer, the scanning module will then be resumed by the control unit to scan the document from where it was stopped.

One problem usually occurs when the step motor is resumed to move the scanning module. For the first few steps the motion of the scanning module is usually quite shaky and unstable which may affect the quality of the scanning module's output during this period. In order to solve such problem, two methods have been developed in the past. The first method is to move the scanning module backward for a predetermined number of steps and then forward the step motor from there. The image data generated over the first few steps will be ignored and when the scanning motor reaches the last stopped position, the motion of the scanning module has become stabilized and the image data will be picked up and stored in the memory buffer. This method solves the unstable problem of the scanning module but it takes time to move the scanning module backward and forward which may delay the overall scanning speed of the scanner. Besides, certain mismatch over the last stopped position generated by such method may also affect the quality of the image data generated over the last stopped position.

The second method is to increase the size of the memory buffer so that more image data can be stored in the memory buffer and the scanning module can scan a document continuously without any temporary pause. Enlarging memory buffer to solve this problem is quite straight forward and easy but it has two drawbacks: it increases both the cost and complexity of a scanner. DRAM (dynamic random access memory) chips are usually used to increase memory buffer size for its low cost. By using DRAM, extra memory refreshing circuit will have to be implemented which makes the memory circuits of the scanner more complex. Besides, increasing memory buffer may not really solve the problem. Current scanners usually allow high resolution color image scanning. Such scan can generate a huge amount of image data within a very short period of time, and it is very unreasonable to simply increase the memory buffer size to alleviate this problem because the increased cost of the scanner can not justify the benefit of such design.

SUMMARY OF THE INVENTION

It is therefore the goal of the present invention, by overcoming the limits of the prior art, to devise a new method to solve the above mentioned problem.

Briefly, in a preferred embodiment, the present invention includes a method for adjusting scanning speed of a scanner connected to a host computer comprising the following steps of:

(1) initiating a time counter and transmitting a test data packet from the scanner to the host computer;

(2) acknowledging the scanner after the test data packet is completely received by the host computer;

(3) stopping the time counter and calculating the time used for transmitting the test data packet;

(4) calculating a data transmission rate according to the size of the test data packet and the time used to transmit the test data packet; and (5) adjusting the scanning speed of the scanner according to the data transmission rate.

The scanner comprises a scanning module for scanning a document and a step motor for moving the scanning module step by step. The scanning speed of the scanner is decided by the stepping speed of the step motor in moving the scanning module. Within each step of the step motor, one line of the document is scanned by the scanning module. When calculating the step motor speed, the test data packet is calculated first to determine the number of lines required for generating the test data packet, and then the stepping speed is determined by using the number of lines calculated and the time used to transmit the test data packet. The host computer receives and processes the test data packet in a manner as it receives and processes a normal data packet generated by scanning a document.

It is an advantage of the present invention that the scanning speed of the scanner is adjusted according to the transmission rate so that accumulation of the image data in the memory buffer can thus be avoided. The problem caused by resuming the scanning module can be avoided and there is no need to increase the memory buffer size of the scanner.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
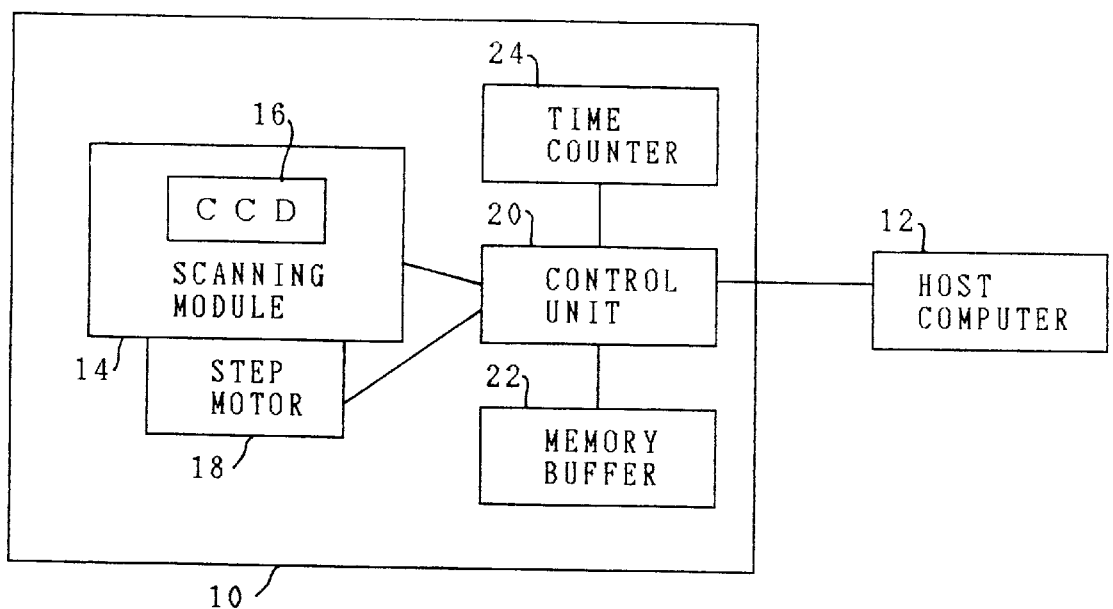
FIG. 1 is a function block diagram of a conventional prior art optic scanner connected to a host.

FIG. 1 is a function block diagram of a conventional prior art optic scanner 10 connected to a host computer 12. The scanner 10 comprises a scanning module 14 having a charge coupled device 16 in it for scanning a document line by line, a step motor 18 for moving the scanning module 14 step by step, a control unit 20 for controlling the operations of the scanner 10 and also communications with the host computer 12, a memory buffer 22 connected to the control unit 18 for storing image data generated from the scanning module 14, and a time counter 24.

Figure 2:
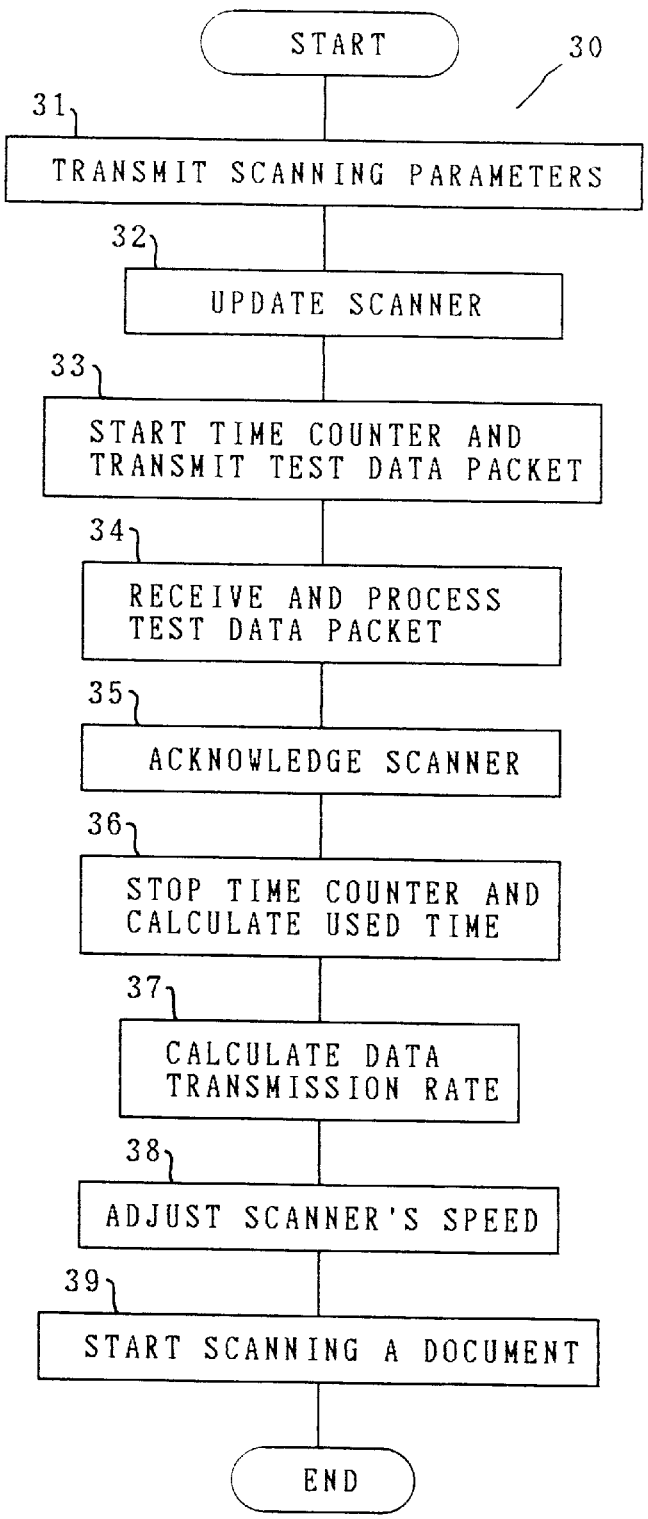
FIG. 2 is a process for adjusting the scanning speed of the scanner shown in FIG. 1 according to the present invention.

FIG. 2 is a process 30 for adjusting the scanning speed of the scanner 10 shown in FIG. 1. The process 30 is usually initiated before scanning a new document. It comprises the following steps:

step 31 transmit a plurality of scanning parameters such as scanning resolution, color/grey mode, etc., from the host computer 12 to the scanner 10;

step 32 update the scanner 10 by using the scanning parameters;

step 33 start the time counter 24 and transmit a test data packet from the scanner 10 to the host computer 12; the size of the test data packet is determined according to the scanning parameters transmitted from the host computer 12;

step 34 receive and process the test data packet in the host computer 12; the host computer 12 receives and processes the test data packet in a manner as it receives and processes a normal data packet generated by scanning a document;

step 35 acknowledge the scanner 10 after the test data packet is completely received and processed by the host computer 12;

step 36 stop the time counter 24 and calculate the time used for transmitting the test data packet;

step 37 calculate a data transmission rate according to the size of the test data packet and the time used to transmit the test data packet;

step 38 adjust the scanning speed of the scanner 10 according to the data transmission rate; and step 39 start scanning a document by using the newly set scanning speed.

The transmitting and receiving of the test data packet in steps 33 and 34 are proceeded in parallel until the test data packet is completely received and processed by the host computer 12. The time counter 24 is used in process 30 for calculating the time for transmitting the test data packet. Other timing devices such as a clock can also be used for such purpose. The test data packet is basically created for testing data transmission rate between the host computer 12 and the scanner 10 before scanning a real document. But the data transmission rate can also be obtained in the same manner when transmitting a normal data packet. A user can use a normal data packet to replace the test data packet in the process 30 when scanning a real document so as to obtain the data transmission rate and then use it to adjust the scanning speed of the scanner 10.

Within each step of the step motor 18, one line of the document is scanned by the scanning module 16 by using the charge coupled device 16. The scanning speed of the scanner 10 is decided by the stepping speed of the step motor 18 in moving the scanning module 14. When calculating the stepping speed of the scanner 10, the number of lines required for generating the test data packet by using the scanning module 14 is determined first, and then the stepping speed of the step motor 18 is determined by using the calculated line number and the time used to transmit the test data packet.

One factor which should be considered when determining the stepping speed of the step motor 18 is synchronization between the step motor 18 and the charge coupled device 20. The charge coupled device 20 periodically detects light conveyed from a document to be scanned within a predetermined exposure period. After each exposure period, it refreshes its internal analog memory cells for the next exposure. If the stepping speed of the step motor 18 can be made synchronized with the exposure period of the charge coupled device 20, extracting data from the charge coupled device 20 will be much simpler. One method to establish synchronization between the step motor 18 and the charge coupled device 20 is to round up the time for the step motor 18 to move one step and make it equal to a whole number of the exposure periods so that easier synchronization control can be achieved between the step motor 18 and the charge coupled device 20.

The process 30 can be used in many ways to determine and set up a proper speed for the scanner 10. It is suggested to initiate the process 30 before scanning each document since it usually takes tens of milli-seconds for testing the transmission rate and processing speed of a host computer. Such time almost can not be sensed by a scanner user. The process 30 not only avoids the drawbacks caused by the two prior art methods mentioned previously, but also provides a very effective and low cost solution which can be easily implemented for solving the above mentioned speed mismatch problem of a scanner.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for adjusting scanning speed of a scanner connected to a host computer comprising the following steps of:

(1) initiating a time counter and transmitting a test data packet from the scanner to the host computer;

(2) acknowledging the scanner after the test data packet is completely received by the host computer;

(3) stopping the time counter and calculating the time used for transmitting the test-data packet;

(4) calculating a data transmission rate according to the size of the test data packet and the time used to transmit the test data packet; and (5) adjusting the scanning speed of the scanner according to the data transmission rate;

wherein the host computer trasmits a plurality of scanning parameters to the scanner for updating the scanner before the scanner starts transmitting the test data packet to the host computer and the size of the test data packet is determined according to the scanning parameters transmitted from the host computer.

2. The method of claim 1 wherein the scanner comprises a scanning module for scanning a document and a step motor for moving the scanning module step by step wherein the scanning speed of the scanner is decided by the stepping speed of the step motor in moving the scanning module.

3. The method of claim 2 wherein the number of lines required for generating the test data packet is calculated first and then the stepping speed is determined by using the calculated line number and the time used to transmit the test data packet.

4. The method of claim 3 wherein the scanning module comprises a charge coupled device which periodically detects light conveyed from the document within a predetermined exposure period and wherein the stepping speed of the step motor is made synchronized with the exposure period of the charge coupled device.

5. The method of claim 4 wherein the time for the step motor to move one step is set equal to a whole number of the exposure periods.

6. The method of claim 1 wherein the scanner adjusts the scanning speed of the scanner before scanning a document.

7. The method of claim 1 wherein the host computer receives and processes the test data packet in a manner as it receives and processes a normal data packet generated by scanning a document.

* * * * *